J. H. McGRAW.
Flue-Cutter.

No. 212,032.   Patented Feb. 4, 1879.

WITNESSES:
Achilles Schehl.
C. Sedgwick.

INVENTOR:
J. H. McGraw
BY Munn & Co
ATTORNEYS.

UNITED STATES PATENT OFFICE.

JOHN H. McGRAW, OF OSWEGO, NEW YORK.

IMPROVEMENT IN FLUE-CUTTERS.

Specification forming part of Letters Patent No. 212,032, dated February 4, 1879; application filed July 8, 1878.

*To all whom it may concern:*

Be it known that I, JOHN H. McGRAW, of Oswego, in the county of Oswego and State of New York, have invented a new and Improved Flue-Cutter, of which the following is a specification:

In cutting flues out of steam-boilers it is usual to employ a hammer and chisel, and the flue is split two or three inches on each end to separate it from the sheet. That method renders it necessary to cut off the end of the tube before it can be brazed or welded, and in removing the tube the sheet is indented, which renders it necessary to file the hole true again, so that a tight joint can be made.

By this method, or others generally employed, the work of cutting out a set of flues and replacing them is a long and expensive operation.

The object of my invention is to furnish a cutter for removing flues which will cut them out quickly without indenting or marring the sheet, and leaves the end of the tube in condition for welding or brazing, and which cutter will be adapted to various-sized flues.

My invention consists in a tool or cutter-head carrying revolving cutters for insertion within the tube, which tool may be expanded by a wedge-pin and turned by a wrench to cut off the tube or flue.

Figure 1:
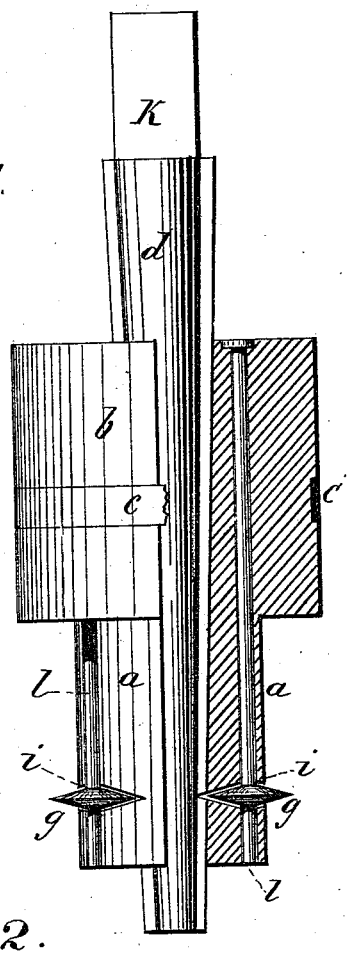
Figure 2:
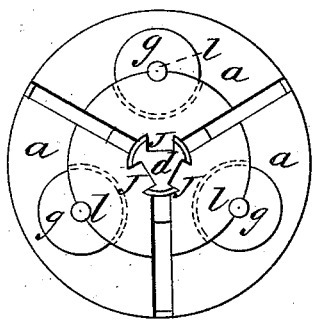

In the accompanying drawings, Figure 1 is an elevation, partly in section, of my improved flue-cutter, and Fig. 2 is an end view of the same.

Similar letters of reference indicate corresponding parts.

The cutter-head consists of three triangular segments, *a a a*, forming, when placed together, a cylinder, having one end, *b*, larger than the other to form an offset which will rest against the boiler-sheet when the smaller end of the cylinder is inserted within the flue. The sections *a* are held together by a spring-band, *c*, in a groove around the outside of the portion *b*, which band *c* laps at its ends, but is not united, and permits the sections to be expanded, as hereinafter described.

There is a tapering hole through the center of the cylinder or cutter-head, the smaller end of the hole being at the smallest end of the cutter-head, and *d* is a wedge-pin inserted through the cutter-head in its tapering hole to expand the sections *a* more or less, according to the distance the wedge-pin *d* is inserted. The angles of the sections *a*, at the center hole, are formed as square projections J, which fit into longitudinal slots in the pin *d*, and the pin takes a bearing the whole length of the cutter-head, so that as the pin is turned by a wrench put upon its square end *k* the cutter-head will turn with the pin.

*g g g* are the cutters, the same being circular disks of steel with cutting-edges, and they are held in slots *i* in the surface of the smaller portion of the cutter-head, near the end thereof, by the pins or arbors *l*, which pass longitudinally through the cutter-head, so that the edges of the cutters project outside of the slots *i*. The cutters *g* revolve upon their arbors *l*, and there is one cutter to each segment *a*.

In using the cutter above described, the small end of the head is inserted within the tube, and the segments *a* expanded by forcing the wedge-pin *i* inward until the cutters *g* bear upon the inner surface of the tube or flue. The head is then revolved by turning the wedge-pin to cause the cutters to cut into the flue, and the sections may be expanded as the cutting proceeds until the flue is cut off.

This operation is quickly done, and requires no special skill. The flue is cut off squarely, and the sheet is not injured.

The segments *a* and pin *d* are to be made of iron or steel to give the required strength.

I do not limit myself to the manner of supporting the cutters in the head, nor to the shape of the wedge-pin. Neither do I confine myself to the number or shape of the segments, as these particulars may be varied without departing from my invention.

Having thus fully described my invention, I claim as new and desire to secure by Letters Patent—

The combination of three triangular sectors, *a b*, held together by a spring-band, *c*, and provided with separate cutters *g*, with a wedge-pin, *d*, jointed to and turning with the sectors, as and for the purpose specified.

JOHN HENRY McGRAW.

Witnesses:
 JOHN CHAUNCEY,
 C. F. LEWIS.